No. 666,942.  
C. G. SUMMERS.  
MACHINE FOR SOLDERING CANS.  
(Application filed Feb. 24, 1900.)  
(No Model.)

Patented Jan. 29, 1901.

3 Sheets—Sheet 1.

WITNESSES:  
INVENTOR:— Charles G. Summers  
By Chas. B. Mann  
ATTORNEY.

No. 666,942. Patented Jan. 29, 1901.
C. G. SUMMERS.
MACHINE FOR SOLDERING CANS.
(Application filed Feb. 24, 1900.)

(No Model.) 3 Sheets—Sheet 2.

WITNESSES:
L. D. Van Horn
Charles B. Mann Jr.

INVENTOR:
Charles G. Summers
By Chas. B. Mann
ATTORNEY.

THE NORRIS PETERS CO., PHOTO-LITHO., WASHINGTON, D. C.

No. 666,942. Patented Jan. 29, 1901.
C. G. SUMMERS.
MACHINE FOR SOLDERING CANS.
(Application filed Feb. 24, 1900.)
(No Model.) 3 Sheets—Sheet 3.
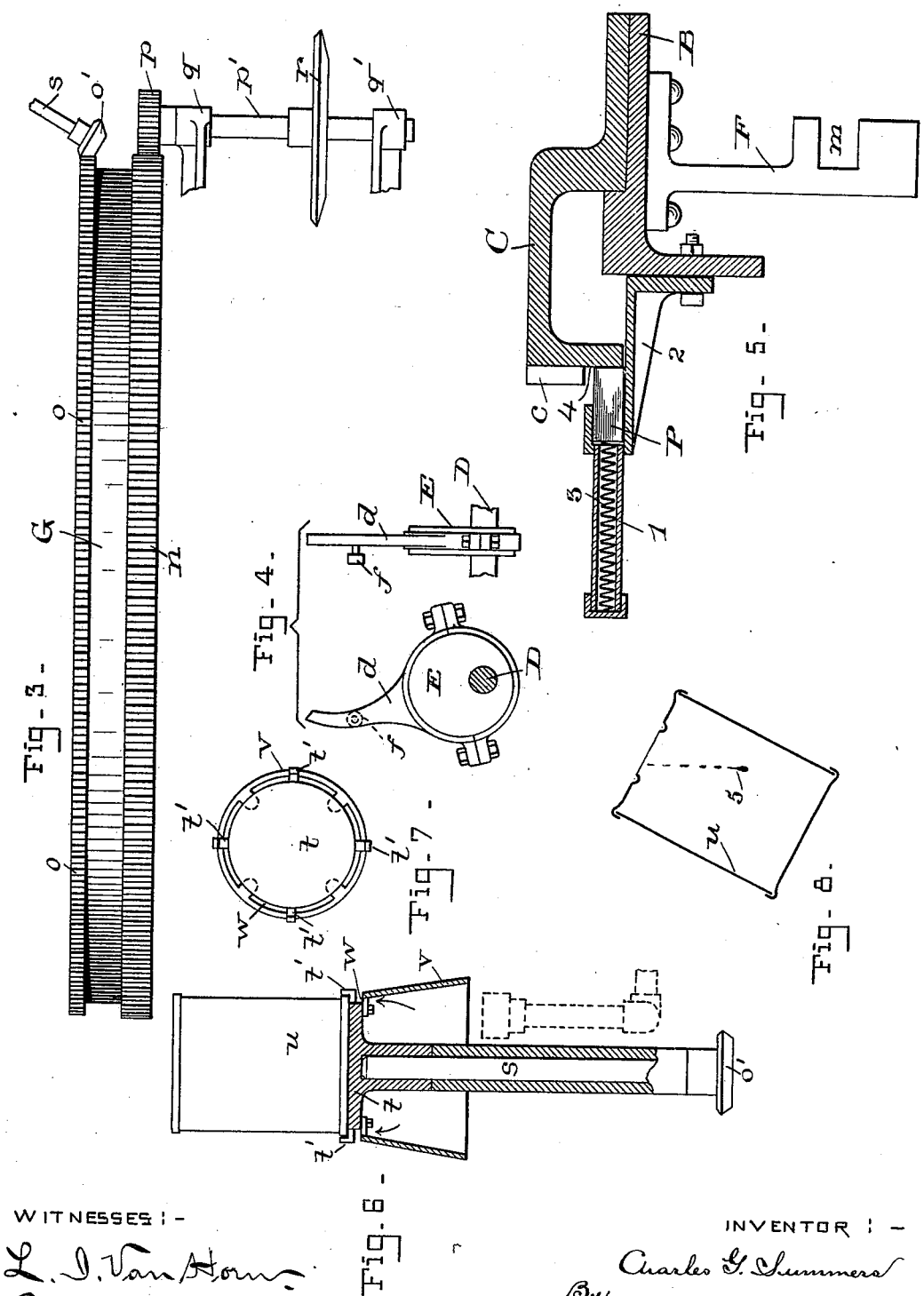

UNITED STATES PATENT OFFICE.

CHARLES G. SUMMERS, OF BALTIMORE, MARYLAND.

MACHINE FOR SOLDERING CANS.

SPECIFICATION forming part of Letters Patent No. 666,942, dated January 29, 1901.

Application filed February 24, 1900. Serial No. 6,354. (No model.)

*To all whom it may concern:*

Be it known that I, CHARLES G. SUMMERS, a citizen of the United States, residing at Baltimore, in the State of Maryland, have invented certain new and useful Improvements in Machines for Soldering Cans, of which the following is a specification.

This invention relates to an improved machine for soldering the end seams of cans.

One object of the invention is to provide for applying molten solder to the seam on the interior of the can while the latter is hot. By first heating the can moderately and then applying molten solder on the interior to the seam of the heated can a perfect union may be effected without any liability of scorching or discoloring the can.

The manner of carrying out the invention is illustrated in the accompanying drawings, in which—

Figure 1:
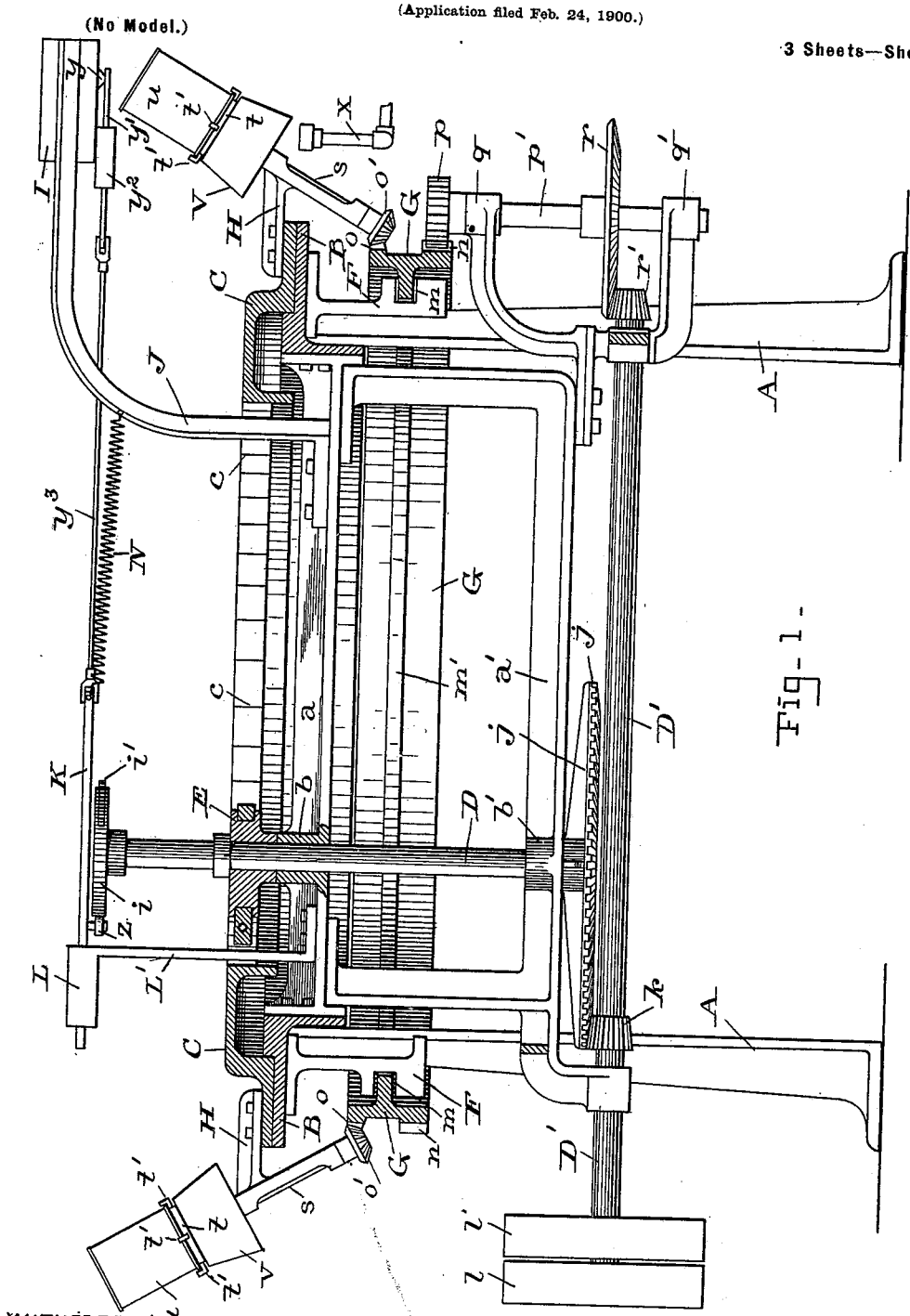
Figure 2:
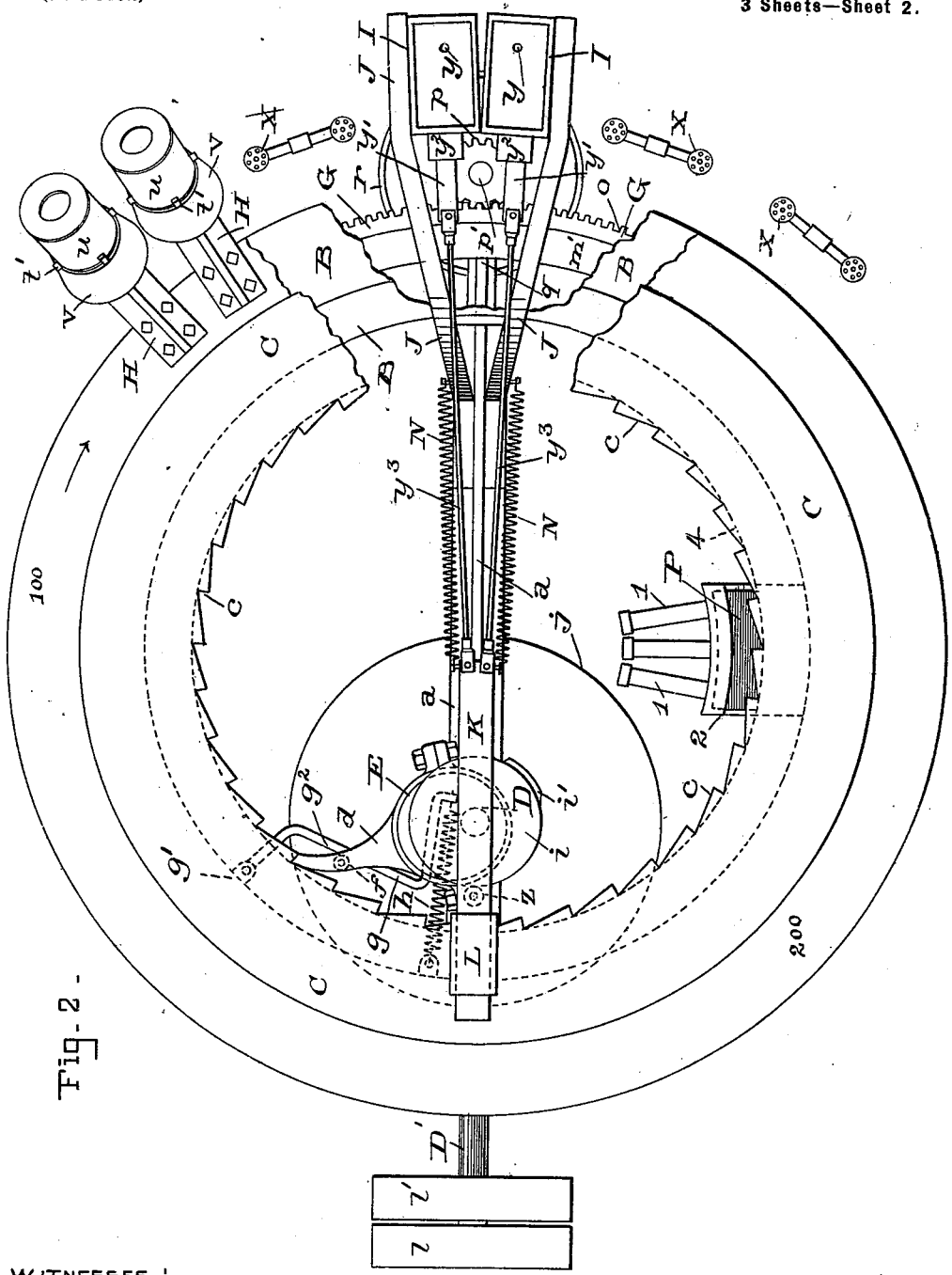

Figure 1 is a vertical section of the entire machine. Fig. 2 is a top plan view of same. Fig. 3 is a side elevation of the continuously-revolving gear. Fig. 4 shows two views of the pawl and eccentric which impart intermittent movement to the can-carrying ring. Fig. 5 is a sectional view, on a larger scale, showing the brake device. Fig. 6 is a vertical sectional view of the can-holder. Fig. 7 is a top view of same. Fig. 8 is a sectional view of a can, showing the molten solder dropping inside.

Referring to the drawings, the letter A designates the legs or supports for the machine, B a circular ring or track which is stationary on said legs, and C a ring-shaped can-carrier resting on the circular ring and which has an intermittent revoluble movement and is provided on its internal rim edge with ratchet-teeth $c$. A horizontal bar $a$ extends diametrically across from one side of the stationary circular ring to the other and serves as a support for certain parts to be hereinafter mentioned. A vertical shaft D has a bearing $b$ on the aforesaid horizontal bar $a$, and another bearing $b'$ is on a lower horizontal bar $a'$. This shaft carries an eccentric E and a pawl $d$, which engages the internal ratchet-teeth $c$ on the intermittent can-carrier ring C and has on its lower side a projecting pin and a friction-roller $f$ on the pin. An irregular-shaped bar $g$ has one end pivoted at $g'$ to the stationary ring-track B, and the other end is free or movable below the eccentric. A spiral spring $h$ connects this free end with the stationary ring-track and normally draws it. This pivoted bar $g$ has a straight portion $g^2$, and as the pawl is moved back and forth by the eccentric the roller $f$ on the lower side of the pawl $d$ travels back and forth on said straight portion $g^2$ of the bar. Thus the pivoted bar $g$ serves to keep said pawl $d$ in constant engagement with the ratchet $c$, and a continuous rotary motion of the vertical shaft D imparts an intermittent revoluble movement to the ring-shaped can-carrier C. The vertical shaft D also carries at its top a cam which consists of a circular head $i$, provided on its rim with a projecting cam-face $i'$. This cam serves to operate the valves of the molten-solder pots, as hereinafter stated. The lower end of the vertical shaft D carries a bevel gear-wheel $j$, which engages a bevel-pinion $k$ on the drive-shaft D', which latter carries a fast and loose pulley $l, l'$.

Hangers F are pendent from the stationary ring-track B, and each hanger has on its outer face a notch $m$. In Fig. 1 only two of these hangers are shown, but a sufficient number are used in practice to properly support the ring-gear G. This latter gear is merely a ring which surrounds all the hangers F and is provided on its inner face with an endless lateral flange $m'$, which takes into the outer notches $m$ of all the said hangers and is revoluble therein. On its outer face this ring-gear has two series of teeth $n$ $o$, one below the other. The lower series $n$ are in gear with a pinion $p$ on an upright shaft $p'$, which is mounted in suitable bearings $q$ $q'$. This upright shaft carries a bevel-wheel $r$, which engages with a bevel-pinion $r'$ on the drive-shaft D'. Thus a continuous rotary motion of the drive-shaft imparts a continuous revoluble movement to the ring-gear G.

The ring-shaped can-carrier C has a number of brackets H secured to it. In Figs. 1 and 2 only two brackets are shown; but in practice these brackets extend all around the ring carrier and the number is limited only by the size of the wheel. Each bracket H carries an inclined spindle $s$, provided at its lower end with a bevel-pinion $o'$, which is in gear with the upper series of teeth $o$ on the outer face of the ring-gear G. Each inclined spindle s carries a can-holder consisting of a solid disk t, provided on its rim with four hook-prongs t'. The end of a tin can u sits flat upon this disk t, and the hook-prongs keep the can from sliding off. A skirt v of tapered or flaring shape is secured to the disk t, and a narrow annular space w is left open between the top of the skirt and the rim of the disk, (see Figs. 6 and 7,) through which space the heat and products of combustion from the burners x find vent. It is not intended nor is it necessary that the flame of the burner shall pass up through this annular space w.

The can-holders, brackets, and burners are arranged in pairs, so that at each pause or intermission in the movement of the ring-shaped can-carrier two cans may be soldered at the same time.

Two solder-pots I are employed. These are sustained in the desired elevated position on a suitable bracket J, which is supported on the said horizontal bar a. Each pot has in its bottom a discharge-teat y, through which the molten solder drops into a can u, which has inclined position below. The discharge-teat is governed by a valve y', which slides through a slideway or guide y². When this valve y' is drawn from under the teat, the latter is open and molten solder will pass out. These valves y' are operated by the cam i i' on the vertical shaft D as follows: A horizontal reciprocating bar K has bearing in a slideway L, mounted on a standard L'. This bar has a downward-pointing pin on which is a roller z. The bar passes over the cam and the roller z is in contact with the circular rim i of the cam. The bar K is connected with both solder-valves y' by rods y³, and spiral springs N connect the bar K with the bracket J, and these springs normally draw on the bar K, so as to keep both solder-valves y' closed. Now when the cam in revolving brings its cam-face i' in contact with the roller z on the bar the latter is thereby moved to the left and the springs N will yield and the valves y' will be drawn from under the teats y, and thereupon a spurt of molten solder will discharge into each can. When the cam-face i' passes the roller z, then the springs N will draw the bar K and the valves y' toward the right hand, and thus close the teats.

A brake device P (see Figs. 2 and 5) is employed to act on the ring-shaped can-carrier C and to prevent it from moving any farther than it is forced by the pawl d, acting on the ratchet-teeth c. This brake device comprises one or more tubes 1, attached to a bracket 2, which is secured firmly to the stationary ring-track B. Each tube contains a compressed spiral spring 3, which presses against the brake-block P, resting upon the said bracket 2. This brake-block is thus pressed against a smooth face 4 on the internal part of the ring-shaped can-carrier C.

From the foregoing description the operation of the machine will be readily understood. An attendant will place the tin cans on the holders at about the location designated 100. The cans are continually revolved. By the time the cans reach the two solder-pots I they have become sufficiently heated, and at this juncture the molten solder is applied inside of the can while it is revolving, and thus the end seams are soldered, one end being soldered at a time. The cans are removed when somewhat cooled at about the location designated 200.

In Fig. 8 is shown a section of a can supposed to be heated, and a drop of molten solder 5 is indicated as falling into the inside of the can to solder the end seam.

It will be seen that the can is at first only moderately heated, because as molten solder is applied inside there is no necessity for heating the can to a degree that will melt the solder, and consequently cans soldered in this manner will not be scorched or discolored.

Having thus described my invention, what I claim as new, and desire to secure by Letters Patent, is—

1. In a can-soldering machine, the combination of a stationary ring-track, a ring-shaped can-carrier sliding around on said track and carrying revoluble can-holders each having a spindle and a pinion on the spindle, notched hangers pendent from the stationary ring-track, a ring-gear having a flange fitted to slide in the notches of the hangers, said ring-gear being provided on its outer face with a series of teeth meshing with said pinions, and means for imparting an intermittent motion to the ring-shaped can-carrier and a continuous motion to the ring-gear.

2. The combination of a stationary ring-track, a ring-shaped can-carrier resting upon and sliding around on said track and carrying revoluble can-holders, hangers pendent from said track, a ring-gear supported on said hangers and operatively connected to the can-holders to revolve the same, means for imparting an intermittent motion to the ring-shaped can-carrier, and means for imparting a continuous motion to said ring-gear.

3. The combination of a stationary ring-track, B; a ring-shaped can-carrier sliding around on said track and provided on its internal rim edge with ratchet-teeth; a vertical shaft, D, projecting up through the ring-track and ring-shaped can-carrier; an eccentric on the said shaft; and a pawl operated by said eccentric, said pawl engaging the said ratchet-teeth.

4. The combination of a stationary ring-track, B; a ring-shaped can-carrier resting upon and sliding around on said track and provided on its internal rim edge with ratchet-teeth; a vertical shaft, D, projecting up through the ring-track and ring-shaped can-carrier; an eccentric on the said shaft; a pawl operated by said eccentric, said pawl engaging the said ratchet-teeth, and provided on its lower side with a friction-roller; a bar, $g$, pivoted at one end to the stationary ring-track; and a spring pressing the free end of said bar to keep the bar against the friction-roller.

5. The combination of a stationary ring-track, B; a ring-shaped can-carrier resting upon and sliding around on said track and provided on its internal rim edge with ratchet-teeth; a vertical shaft, D, projecting up through the ring-track and ring-shaped can-carrier; an eccentric on the said shaft; a pawl operated by said eccentric, said pawl engaging the said ratchet-teeth; a cam also on the said vertical shaft; a pot for molten solder and provided with a valve; and connections between the said cam and solder-valve.

6. The combination of a stationary ring-track, B; a ring-shaped can-carrier resting upon and sliding around on said track; a stationary support within the stationary ring-track; a bracket, J, resting on said stationary support and sustaining a molten-solder pot; can-holders mounted on said ring-shaped can-carrier and each holder having an inclined spindle and pinion, $o'$; hangers, F, pendent from the stationary ring-track; a ring-gear, G, surrounding all the said hangers and supported thereon, and provided on its outer face with two series of teeth, $n$, $o$, the upper series of which engage all the said pinions of the can-holders; and an upright shaft, $p'$, carrying a pinion, $p$, which engages the said lower series, $n$, of teeth.

In testimony whereof I affix my signature in the presence of two witnesses.

CHARLES G. SUMMERS.

Witnesses:
CHARLES B. MANN, Jr.,
CHARLES L. VIETSCH.